Figure 3:
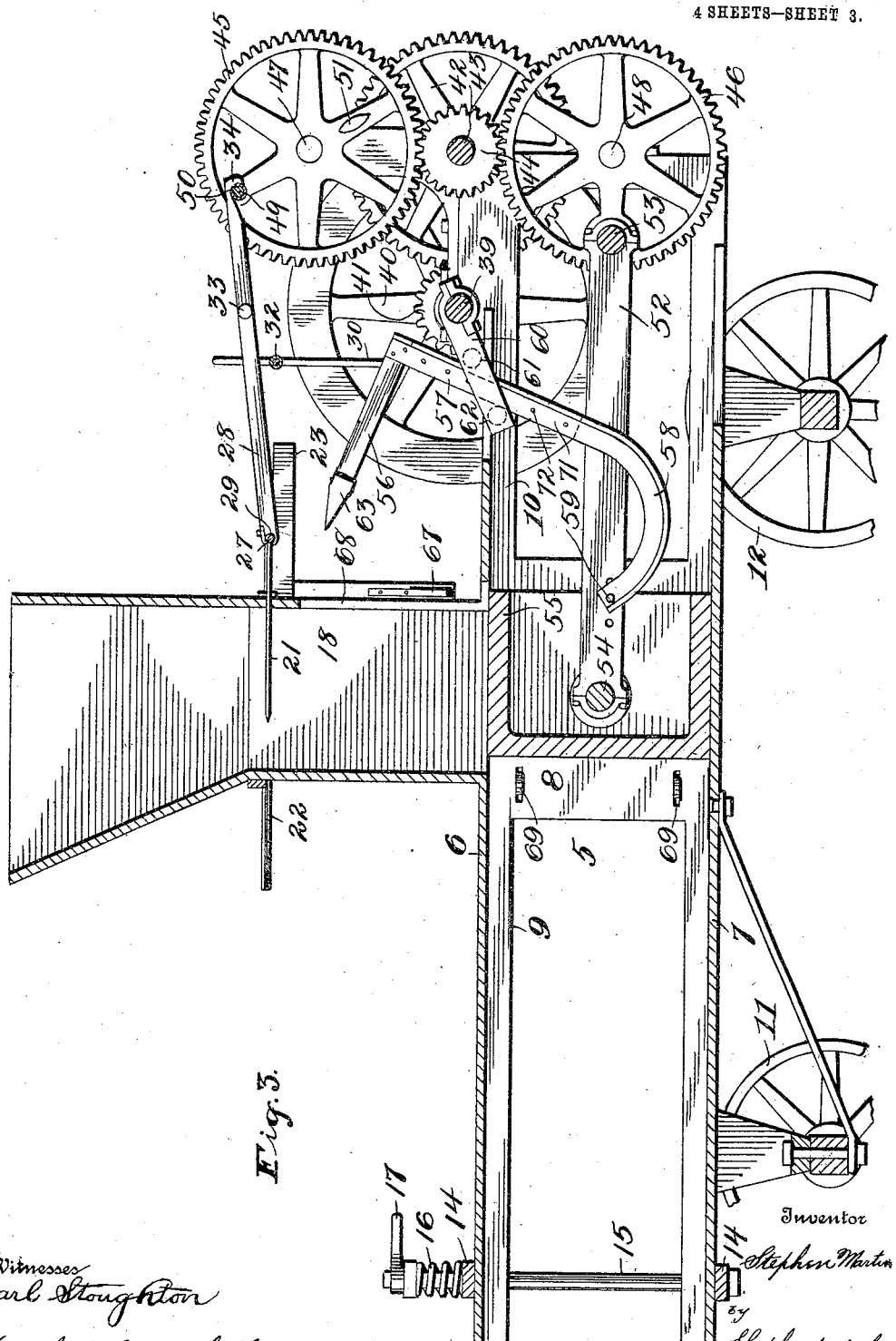

No. 860,755. PATENTED JULY 23, 1907.
S. MARTIN.
BALING MACHINE.
APPLICATION FILED MAY 5, 1906.
4 SHEETS—SHEET 1.
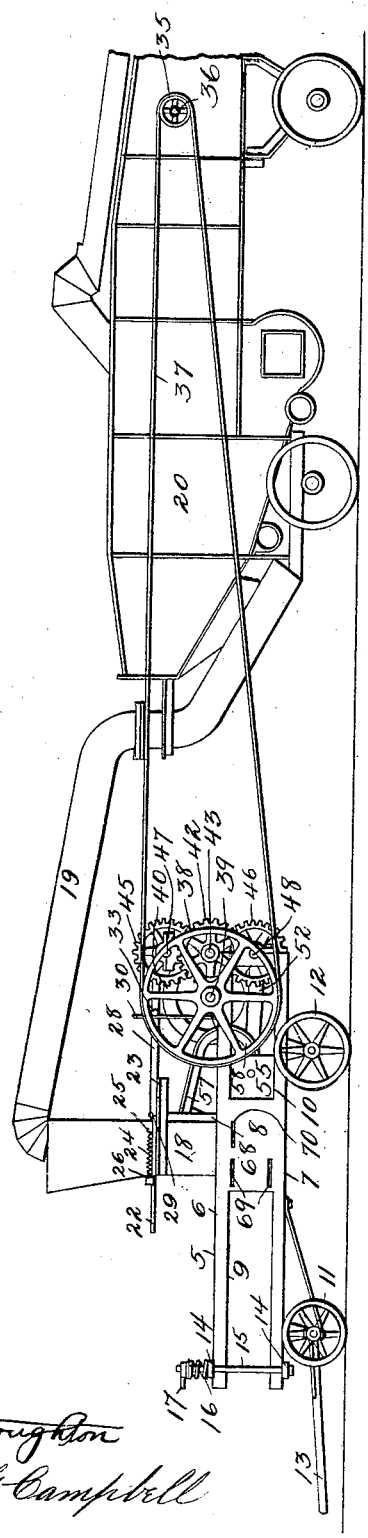
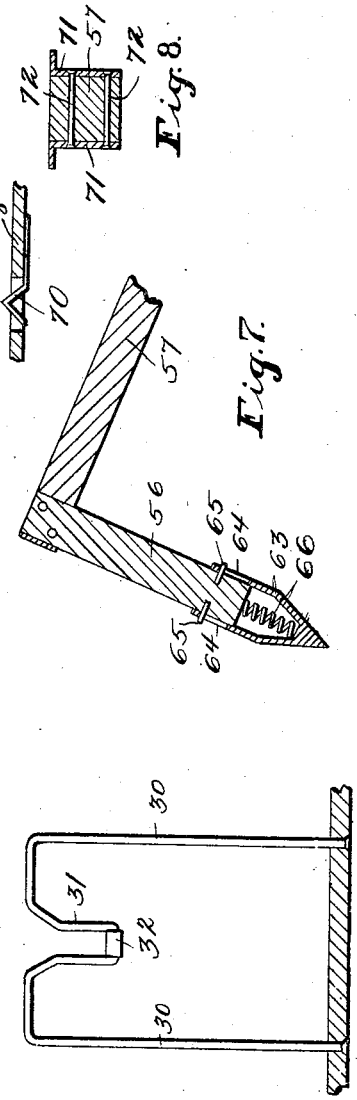
Witnesses
Carl Stoughton
Frank G. Campbell
Inventor
Stephen Martin.
By
Shepherd & Parker
Attorneys

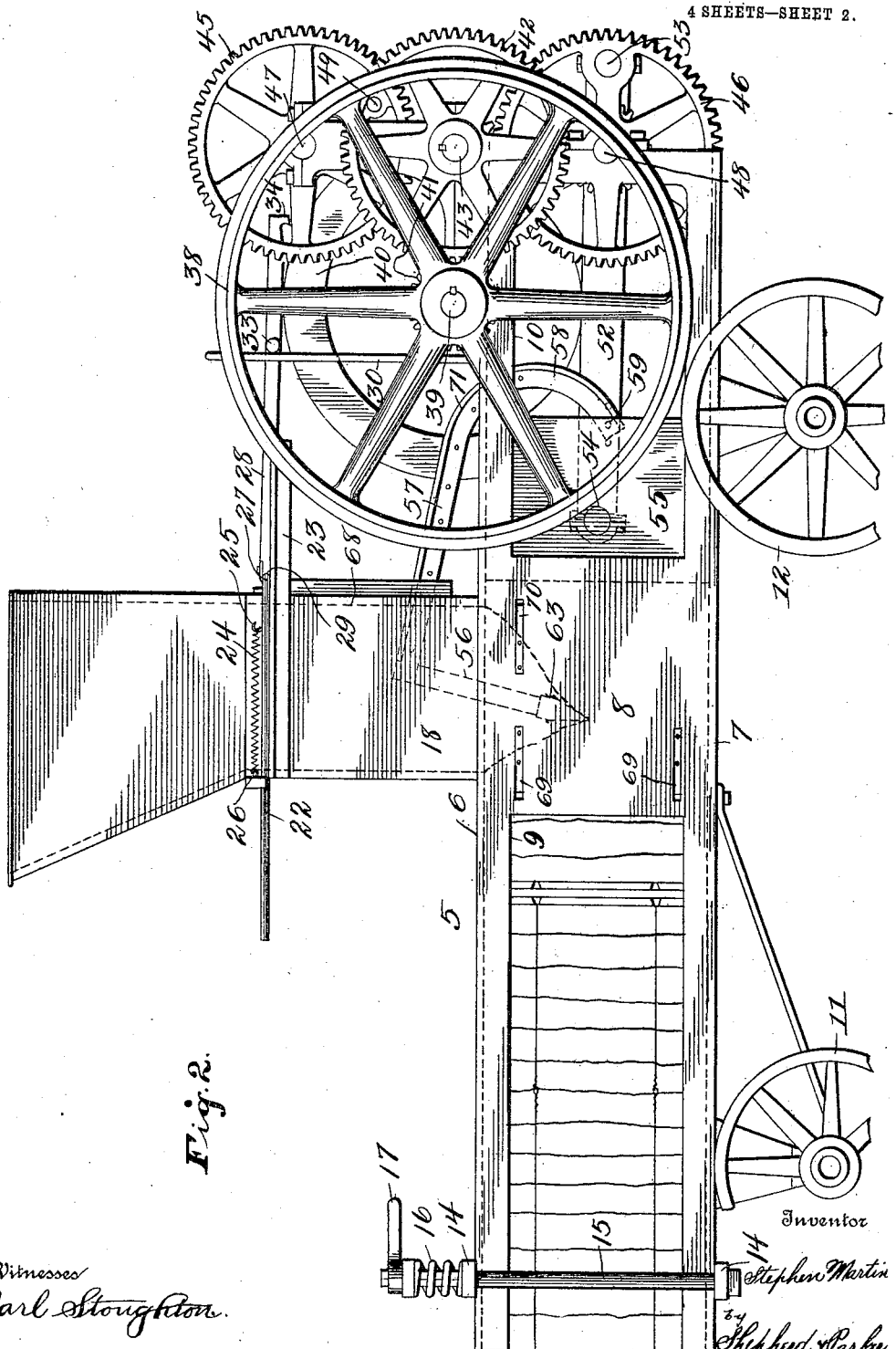

No. 860,755. PATENTED JULY 23, 1907.
S. MARTIN.
BALING MACHINE.
APPLICATION FILED MAY 5, 1906.

4 SHEETS—SHEET 3.

Witnesses
Carl Stoughton
Frank S. Campbell

Inventor
Stephen Martin
by
Shepherd & Parker
Attorneys

No. 860,755. PATENTED JULY 23, 1907.
S. MARTIN.
BALING MACHINE.
APPLICATION FILED MAY 5, 1906.

4 SHEETS—SHEET 4.

Witnesses
Carl Stoughton
Frank G. Campbell

Inventor
Stephen Martin
by Shepherd & Parker
Attorneys

UNITED STATES PATENT OFFICE.

STEPHEN MARTIN, OF WEST JEFFERSON, OHIO.

BALING-MACHINE.

No. 860,755.  Specification of Letters Patent.  Patented July 23, 1907.

Application filed May 5, 1906. Serial No. 315,317.

*To all whom it may concern:*

Be it known that I, STEPHEN MARTIN, a citizen of the United States, residing at West Jefferson, in the county of Madison and State of Ohio, have invented certain new and useful Improvements in Baling-Machines, of which the following is a specification.

My invention relates to a baling machine, and has for its object the provision of a device of this character adapted to receive straw directly from the threshing machine and to compress said straw into bales ready for the market.

A further object of the invention is the provision of a baling machine geared in such manner that it is adapted to be belted directly to the cylinder of the threshing machine and to be driven therefrom and also adapted to receive the straw directly from the pneumatic chute of the threshing machine, whereby the straw from the threshing machine may be baled without an intermediate handling.
Further objects and advantages of the invention will be set forth in the detailed description which now follows.

In the accompanying drawings: Figure 1 is a view in side elevation of my improved baling machine, illustrating the manner in which it is belted to the threshing machine, Fig. 2 is an enlarged side elevation of the baling machine, Fig. 3 is a longitudinal vertical section of said baling machine, Fig. 4 is a plan view of said baling machine, Fig. 5 is a plan view of a spring clip hereinafter described, Fig. 6 is a front elevation of a yoke hereinafter described, Fig. 7 is a vertical section of a packing head hereinafter described, and, Fig. 8 is a transverse section of the arm upon which said packing head is mounted.
Like numerals designate corresponding parts in all of the figures of the drawings.

Referring to the drawings, the numeral 5 designates the body portion of my improved baling machine. This body portion comprises a top 6, a bottom 7 and side walls 8, said side walls 8 being cut away at 9 and 10 in the usual manner. This body is mounted upon wheels 11 and 12 and is provided with a tongue 13. Cross bars 14, vertical rods 15, springs 16 and tightening handles 17 form a tension device of the usual and well known construction.

Located upon the top of the machine and in line with the closed portion of the sides, is a hopper 18 adapted to receive straw through the pneumatic chute 19 of the threshing machine 20. This hopper is adapted to be intermittently closed by a hay fork. This hay fork comprises tines 21 and side rods 22, said side rods lying outside of the hopper and traveling upon guides 23. Springs 24, one end of which are secured to the rods 22 as at 25, and the other ends of which are secured to a block 26, carried upon the rear face of the hopper, tend to throw the fork formed by the tines 21 toward the rear wall of the hopper and thereby close said hopper to the passage of straw. The bars 22 are connected by a cross member 27 to which a guiding arm 28 is secured as at 29. A yoke formed by vertical rods 30 is secured to the top 6 and has a depending portion 31 in which is mounted a roller 32. This roller 32 serves to support the arm 28 and to hold the free end of said arm in position to be engaged by a roller which is carried by the gear wheels as will be presently set forth. The arm 28 is provided with transversely disposed lugs 33 located upon each side thereof, and the outer end of said arm is formed into a hook 34. A pulley 35 is secured to the shaft of the cylinder of the threshing machine indicated at 36 and said pulley is connected by a belt 37 with a driving pulley 38. This driving pulley 38 is fast upon a shaft 39 which extends transversely of the baling machine and has secured upon its opposite end a balance wheel 40. Secured upon the shaft 39 are pinions 41. These pinions mesh with gear wheels 42 which are fast upon a shaft 43. Pinions 44 are likewise secured upon this shaft 43 and mesh with gear wheels 45 and 46. The gear wheels 45 are mounted upon a shaft 47, while the gear wheels 46 are mounted upon a shaft 48.

Figure 4:
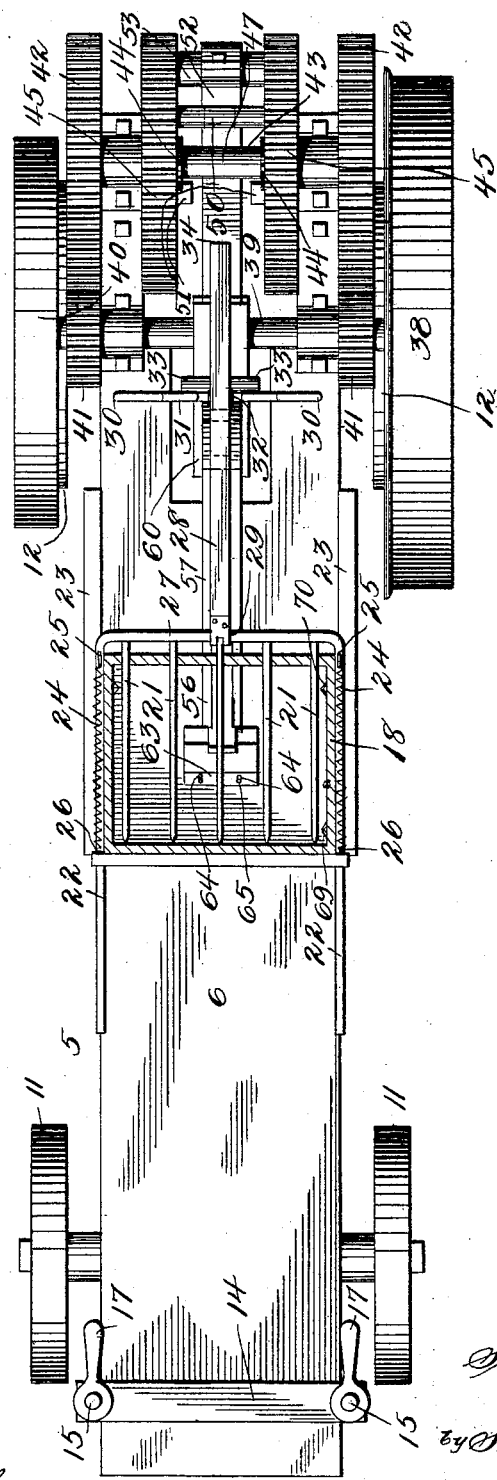

As is best illustrated in Figs. 3 and 4, a pin 49 is secured between the gear wheels 45 and supports a roller 50 with which the hooked end 34 of the arm 28 is adapted to engage. Lugs 51 are carried by the spokes of the gear wheels 45 and serve the purpose which will be set forth in the operation of the machine. One end of a connecting rod 52 is secured to a wrist pin 53 carried between the gear wheels 46, while the opposite end of said connecting rod is pivoted to a wrist pin 54 carried by a plunger 55, said plunger being slidably disposed in the body portion 5. A packing head 56 is carried upon the end of an arm 57, the lower portion of which is curved as at 58 and pivoted at 59 to the connecting rod 52. The upper portion of this curved arm 57 passes through a yoke 60 which is mounted for swinging movement on the shaft 39 and is provided with rollers 61 and 62 against which the front and rear faces of the arm 57 bear. The end of the head 56 is provided with a metal shoe 63 which is slotted as at 64. Pins 65 pass through these slots and enter the head 56 by virtue of which construction the shoe 63 has a sliding engagement with said head. A spring 66 bears between the lower portion of the head and the shoe and tends to force said shoe outwardly to its limit of movement. Springs 67, only one of which is shown, are located at each side of an opening 68 formed through the front of the hopper. V-shaped springs 69 and 70 project through the closed portion of the side walls and serve to prevent the follower boards from falling over when they are first placed in position.

The operation of the machine is as follows: Straw is fed directly into the hoppper 18 from the chute 19. As the cylinder of the threshing machine rotates, the driving wheel 38 is rotated to the right in Fig. 1. This rotates the gear wheels 42 to the left and the gear wheels 45 and 46 to the right. The rotation of the gear wheels 46 imparts a reciprocatory movement to the plunger 55 through the connecting rod 52. As the plunger moves forward to compress a charge, the roller 50 engages the hooked end 34 of the arm 28 and partially withdraws the fork formed by the tines 21 from across the hopper, permitting a charge of the incoming straw to descend through said hopper. When, during the rotation of the gear wheels 45, the lugs 51 contact with the pins 33, the hooked end 34 of the arm 28 is lifted from the roller and the fork formed by the tines 21 is caused to close the hopper under the influence of the springs 24, to thereby prevent more straw from passing into the lower portion of the hopper. As the plunger moves rearwardly, the packing head assumes the position illustrated in Fig. 2, packing the charge of straw into the body of the machine. As the plunger moves forward to compress the charge of straw into the bale which is being formed, the head will be lifted out of the way, as shown in full lines in Fig. 3. When sufficient straw has been packed by the plunger to form a bale, a follower board is inserted between the springs 67 and is prevented from dropping into the lower portion of the machine by the springs until the lower face of the arm 57 presses said board downwardly. Said board then drops into the lower portion of the machine and is held in a vertical position by the spring detents formed by the springs 69 and 70 until the plunger forces said board up against the end of the bale.

Heretofore it has been customary to bale the straw in a separate operation from the operation of threshing, necessitating the employment of an additional engine at a greatly increased cost. It has not required as much time to bale the straw as to thresh the wheat from which the straw that is to be baled, is derived. By making the operation of threshing and the operation of baling a simultaneous one and by gearing the baler to the cylinder of the threshing machine, I am enabled to save considerable time and labor, for the cylinder of a threshing machine is very large and heavy and rotates at a high rate of speed. It is not necessary to have the parts of the baling machine, rotate at nearly so high a speed and I am therefore enabled to gear said baling machine down to about forty revolutions per minute of the gear wheels 46 to which the plunger is connected. The cylinder of the threshing machine rotates at about twelve-hundred revolutions per minute. Since it is necessary in threshing the wheat, to have this cylinder rotate at a high rate of speed throughout the day, by connecting direct to the cylinder and gearing the baling machine down as shown and described, I am enabled to bale the straw in a continuous operation with the expenditure of a very small amount of power. The structure of the head illustrated in Fig. 7, provides a yielding head which prevents the arm 57 from being bent if an undue amount of straw enters the hopper to be forced down by said head. Angle plates 71 are secured by pins 72 to the arm 57 and strengthen and brace said arm laterally.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

In a baling machine, the combination with a body portion, of a hopper adapted to deliver straw to said body portion, a hopper closing member horizontally disposed in the hopper, a driving wheel, gear wheels connected to said driving wheel, an arm connected to the hopper closing member, members carried by some of the gear wheels adapted to engage and impart longitudinal movement to said arm, releasing members carried by the gear wheels adapted to engage the said arm and release it after it has been given a predetermined movement, a plunger, means for imparting reciprocatory movement to said plunger, and a compressing member connected to said last named means and adapted to compress the straw into the body portion of the machine and in front of the plunger.

In testimony whereof I affix my signature in presence of two witnesses.

STEPHEN MARTIN.

Witnesses:
FRANK G. CAMPBELL,
A. L. PHELPS.